Feb. 10, 1970    J. R. BIARD ET AL    3,495,170
METHOD FOR THE INDIRECT MEASUREMENT OF RESISTIVITIES
AND IMPURITY CONCENTRATIONS IN A SEMICONDUCTOR
BODY INCLUDING AN EPITAXIAL FILM
Original Filed Oct 2, 1961    3 Sheets-Sheet 1
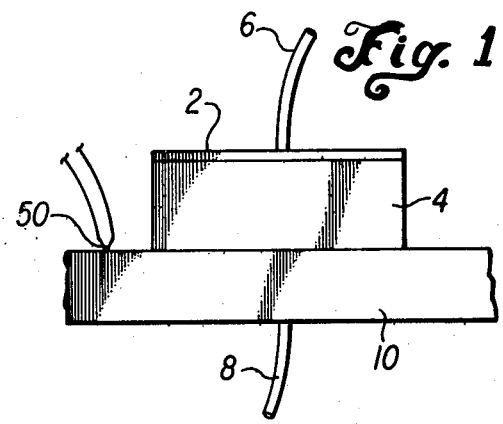
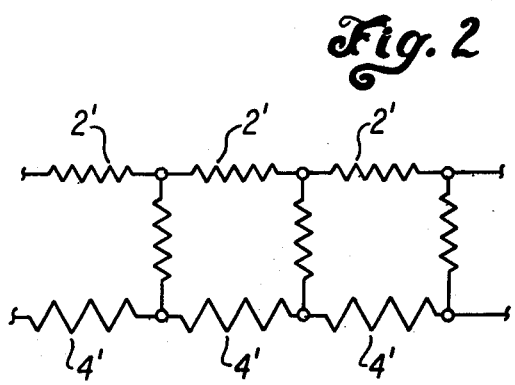
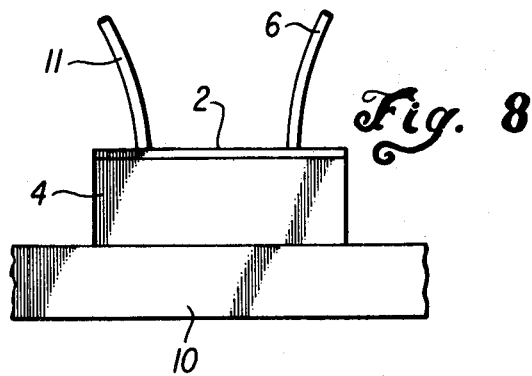
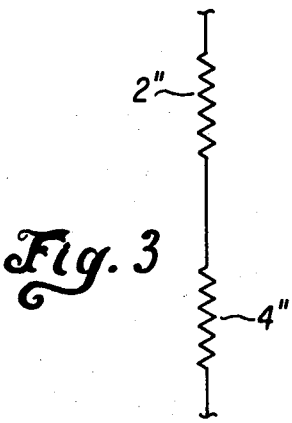
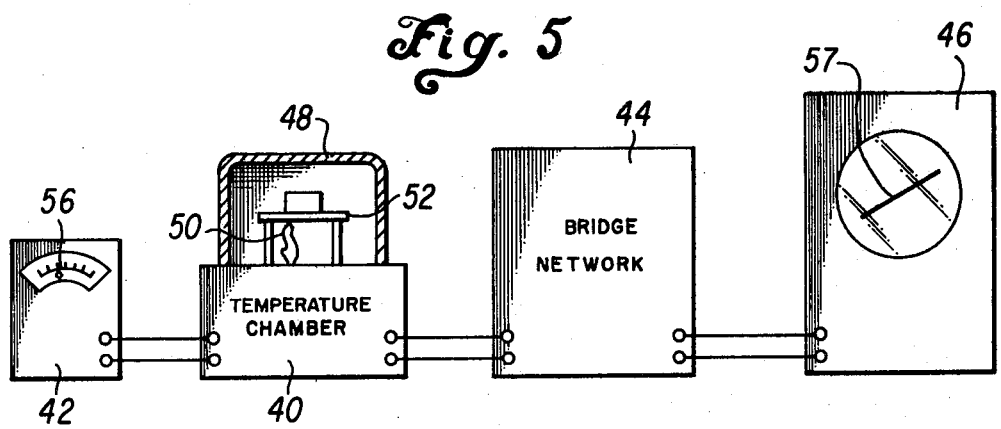
INVENTOR
JAMES R. BIARD,
STACY B. WATELSKI
BY
ATTORNEY

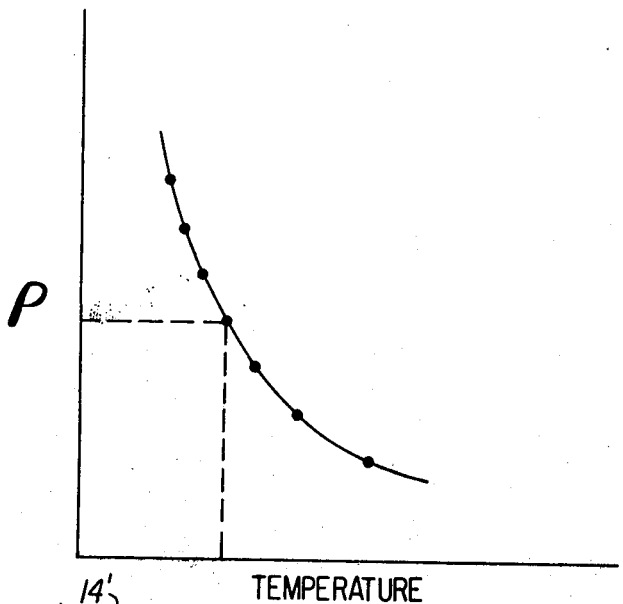
Fig. 6
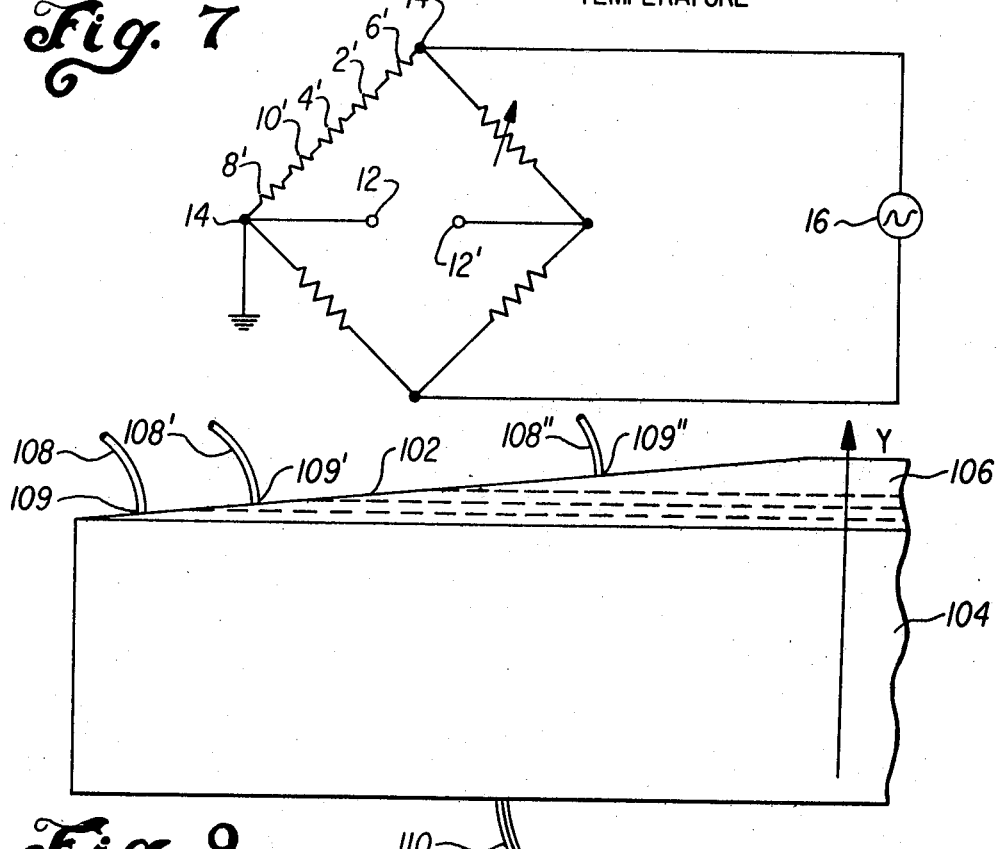
Fig. 7
Fig 9

United States Patent Office 3,495,170
Patented Feb. 10, 1970

3,495,170
METHOD FOR THE INDIRECT MEASUREMENT OF RESISTIVITIES AND IMPURITY CONCENTRATIONS IN A SEMICONDUCTOR BODY INCLUDING AN EPITAXIAL FILM
James R. Biard, 207 Martha Manor, Richardson, Tex. 75080, and Stacy B. Watelski, 1809 Oates Drive, Dallas, Tex. 75228
Application Mar. 11, 1966, Ser. No. 533,736, which is a continuation of application Ser. No. 142,336, Oct. 2, 1961. Divided and this application Nov. 24, 1967, Ser. No. 711,462
Int. Cl. G01r 27/02
U.S. Cl. 324—62   4 Claims

ABSTRACT OF THE DISCLOSURE

The electrical resistivity of an epitaxial semiconductor film is determined by an indirect method which includes the steps of electrically balancing the semiconductor in an impedance bridge at a reference temperature, and then rebalancing the bridge at a higher temperature by heating the semiconductor, such rebalancing occurring after the increase in temperature has initially caused an increase in resistivity, followed by a decrease in resistivity, the resistivity of the semiconductor at the rebalanced temperature being substantially equal to the resistivity at the reference temperature. The rebalance temperature is then converted to resistivity by means of a calibration curve prepared by measuring the resistivity and rebalance temperature of several semiconductor samples having known resistivities.

---

Figure 4:
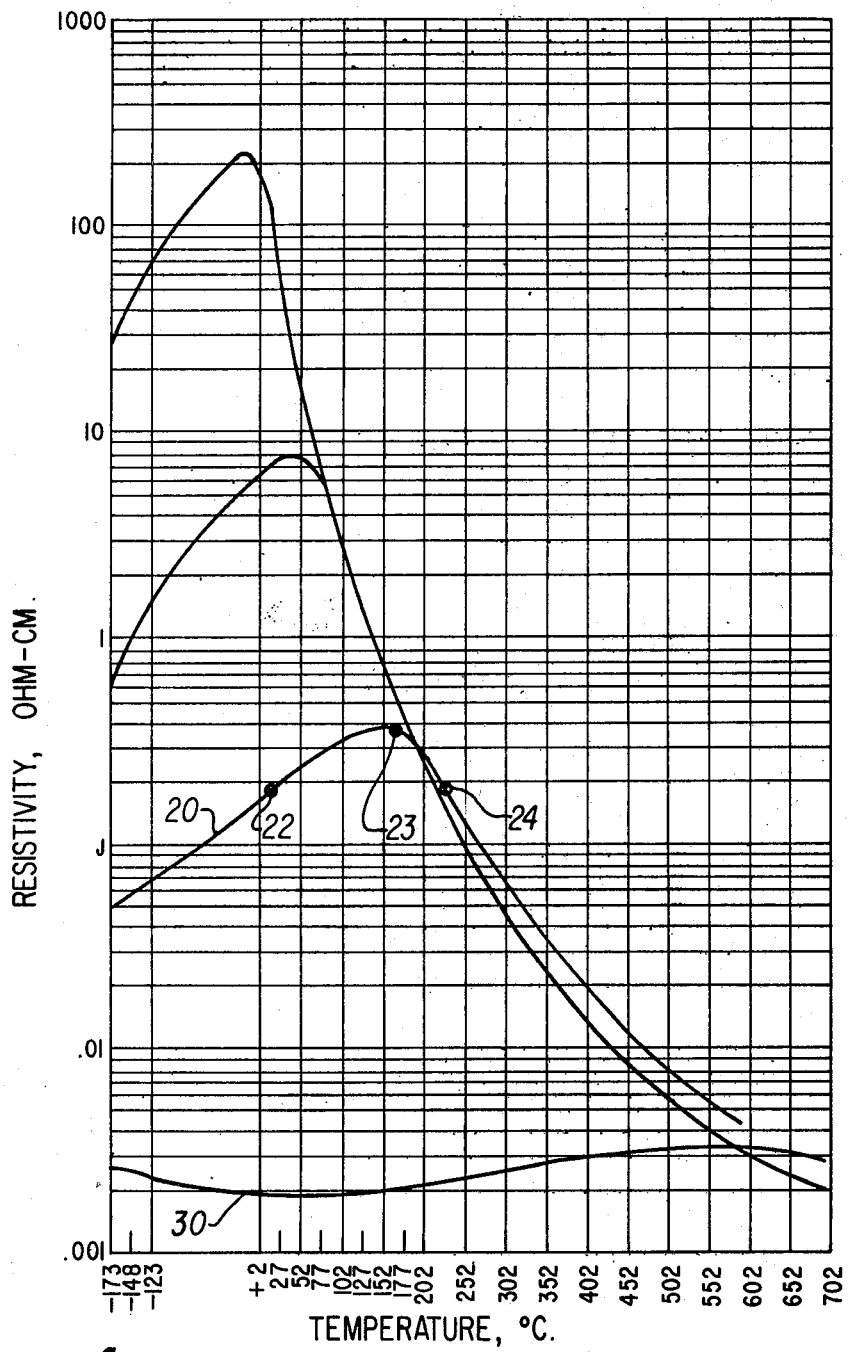

This application is a division of our application Ser. No. 533,736, filed Mar. 11, 1966, now abandoned, which was a continuation of our application Ser. No. 142,336, filed Oct. 2, 1961, now abandoned.

The present invention relates to a method of and apparatus for measuring electrical properties of a semiconductor, such as specific resistivity, impurity concentration and the like. More specifically, this invention relates to a method of an apparatus for measuring the resistivity of a thin film of semiconductor of a given conductivity type deposited on, or electrically connected to, a low resistivity semiconductor body of the same conductivity type.

Much of the present semiconductor technology involves design and fabrication for transistors and diodes wherein a very thin, single crystal film, or layer, of semiconductor material is grown on a very low resistivity semiconductor body of the same conductivity type. Those familiar with this particular field of endeavor realize the importance of such fabrication techniques and the problems associated therewith. At least one of those problems manifests itself in the determination of the electrical properties of these thin films after they have been deposited on the low resistivity substrate, the relevant properties being resistivity, impurity concentration and the like. The difficulty in measuring the resistivity of the thin film by conventional methods and apparatus is apparent from the fact that the low resistivity body on which it is deposited partially or completely shunts the film electrically if the body is of the same conductivity type as the film deposited thereon. Thus, for example, the conventional four point probe method used for resistivity measurements is totally inadequate for the measurements of these films. Moreover, conventional methods, in most instances, require knowledge of the geometry and/or bulk resistance of the sample being measured for resistivity determinations.

It is therefore a primary object of the present invention to provide a novel method and related apparatus for measuring electric properties of semiconductors.

It is another object of this invention to provide a method and related apparatus for measuring electrical properties of a thin film of semiconductor deposited on, or electrically connected to, very low resistivity substrate material.

It is still another object of this invention to provide a method and apparatus for measuring electrical properties of a thin film of semiconductor of a given conductivity type deposited on, or electrically connected to, a body of low resistivity semiconductor of the same conductivity type.

It is yet another object of this invention to provide a method and apparatus for measuring the resistivity of a semiconductor wherein knowledge of the geometry and bulk resistance of the semiconductor is not required.

These and other objects and advantages will become apparent from the following detailed description of the preferred method and related apparatus of the invention when taken in connection with the appended claims and the attached drawing, in which like reference numerals designate like parts in all figures of the drawings, and in which:

FIGURE 1 illustrates one arrangement of a thin film of semiconductor deposited on a low resistivity body and its related electrical connections;
FIGURE 2 is one electrical schematic of the arrangement of FIGURE 1;
FIGURE 3 is another electrical schematic of the arrangement of FIGURE 1;
FIGURE 4 is a graphical representation of the resistivity plotted versus temperature for P-type germanium of several different impurity concentrations;
FIGURE 5 is a diagram in block form of the apparatus used for the measurements of this invention;
FIGURE 6 is a graph employed in calibrating the apparatus of FIGURE 5;
FIGURE 7 is an electrical schematic of a simplified impedance bridge circuit;
FIGURE 8 illustrates another arrangement of a thin film of semiconductor deposited on a low resistivity body and its related electrical connections; and
FIGURE 9 is a sectional view of a thin film of semiconductor deposited on a low resistivity body wherein a portion of the film has been bevel lapped at a very slight angle.

Referring to FIGURE 1, there is shown a view (not necessarily drawn to scale) of a very thin, single crystal semiconductor film 2 that has been deposited, or grown, on a surface of a very low resistivity semiconductor body 4 of the same conductivity type as the film. In transistor design, the film 2 is usually very thin, in the order of a few tenths of mils, whereas the semiconductor body 4 is normally very thick in comparison, for example, in the order of several mils. Moreover, it is desirable that the semiconductor body 4 have an extremely low resistivity (about .002 ohm-cm. for P-type germanium, for example), so that appreciable resistance is not added to the final design of the transistor. Conversely, the resistivity of the thin film 2 is usually in the order of several tenths of an ohm-cm., or higher, and sometimes as high as several ohm-cm.

Once the film has been deposited or grown on the surface of the semiconductor body 4, it is desirable to know the electrical resistivity of the film which, in itself, will indicate the actual impurity concentration existing therein. Such measurements are extremely useful in the design and fabrication of transistors to ensure reliability of the process of depositing films so as to yield desired resistivity values. However, conventional methods of measuring the resistivity of the film are inadequate in this case. For example, if a four point probe technique is used, the low resistivity body 4 shunts out any resistance that the film 2 would ordinarily exhibit. This is apparent from the schematic diagram of FIGURE 2, since the four point probe method relies on current passing through the film in a lateral direction and a corresponding voltage drop determination thereacross. Because of the shunting effect of the resistance 4' of semiconductor body 4 when in parallel with resistance 2' of film 2, no voltage of appreciable value is observed across the film with the four point probe. On the other hand, if the current passes through the film 2 in the direction of its thickness, and likewise for the semiconductor body 4, very little resistance 4" is added to this combination by the semiconductor body, almost the entire resistance 2" of the combination being due to the semiconductor film. This is apparent from the schematic circuit of FIGURE 3, and this configuration is used to advantage in the present invention, as hereinafter shown.

Referring to FIGURE 4 there is shown a graph of the resistivity (ordinate) versus the temperature (abscissa) for P-type germanium of several different impurity concentrations. The curve designated by numeral 20 is illustrative of P-type germanium containing about $2 \times 10^{16}$ P-type impurities/cm.$^3$, the resistivity attaining a maximum value, indicated at numeral 23, of about 0.37 ohm-cm. at about 157° C. If a reference temperature 22 is selected, for example, room temperature (27° C.), the corresponding resistivity is about .195 ohm-cm. As the temperature of the semiconductor body is increased, the resistivity initially increases but returns to the reference temperature resistivity at approximately 214° C., designated by numeral 24; for higher concentrations of impurities, the maximum resistivity point occurs at higher temperatures, as indicated by the curve designated by numeral 30 for germanium containing about $10^{19}$ impurities/cm.$^3$. Moreover, the percent change in resistivity as a function of temperature decreases as the impurity concentration increases. Similar curves can be obtained for N-type germanium, P- and N-type silicon and other semiconductors.

The present invention advantageously employs the phenomenon that the resistivity of semiconductors attains, a maximum value at a specified temperature, the maximum resistivity and the temperature of occurrence thereof depending on the particular semiconductor, impurity and concentration therein. The semiconductor sample to be measured is electrically connected in one arm of an impedance bridge, and the bridge is balanced when the temperature of the semiconductor is maintained at a reference temperature below the temperature at which maximum resistivity occurs. The sample is then heated to a temperature sufficiently greater than that at which maximum resistivity occurs to rebalance the bridge. As will be described hereinafter, specific resistivity and impurity concentration of the unknown sample can be determined from the balance-rebalance technique.

Since the inherent function of the apparatus of the invention is an impedance measurement, and since it is desired to translate this information into specific resistivity values, some meaningful correlation must exist between the absolute resistance of the film and the specific resistivity. Thus, for expediency, only semiconductors of uniform impurity concentration throughout are considered in the first described embodiment of the invention, this restriction not being imposed on other embodiments. In its simplest form, the method and apparatus of the invention are used to measure only films of uniform impurity concentration throughout; therefore, having a uniform resistivity throughout. Moreover, the apparatus and method of the invention achieve greatest accuracy when the unknown semiconductor sample is doped only with impurities that determine a single conductivity type, there being no impurities therein that determine, or tend to determine, an opposite conductivity type so as to compensate the impurities of the first type. And, although the apparatus and method herein described are useful in determining the resistivity of compensated semiconductor samples, as will be described hereinafter, the invention will be first described in its preferred embodiment with reference to a semiconductor sample uniformly doped only with impurities that determine a single conductivity type. To facilitate the description of the invention, reference will be had to P-type germanium, although any semiconductor may be used herewith.

FIGURE 5 is an illustrative block diagram of the apparatus used in making measurements according to the present invention. The semiconductor 48 whose resistivity is to be measured is mounted in a temperature chamber 40 with a thermocouple 50 positioned therein to accurately sense the temperature of the semiconductor body. A temperature monitor 42, having a direct reading scale 56, is employed to indicate the temperature of the semiconductor body. As will be explained hereinafter, the semiconductor body 48 is connected in one arm of an A-C impedance bridge 44, an oscilloscope 46 being used with the bridge as a null indicating device. Moreover, as will be shown hereinafter, the oscilloscope, in addition to being a null indicating device, acts as a phase meter.

Several wafers of P-type germanium of different impurity concentrations and each having a known resistivity at some reference temperature, say room temperature, are used to calibrate the apparatus of FIGURE 5. The slices are severally mounted in the temperature chamber 40 on a metallic strip 52 used for heating the semiconductor. The thermocouple 50 is positioned in the near vicinity of the semiconductor in such a manner as to accurately indicate its temperature via temperature monitor 42. Spaced-apart contacts are made to the semiconductor wafer with metallic or metallic alloy leads, and the wafer is connected in one arm of the circuit of the A-C bridge 44 via these leads. (The ohmic connections made by the leads must be such that a solid ohmic connection is maintained with the wafer at the highest temperature to which the wafer is subjected during the measuring process.) A suitable power supply (not shown) is used to supply power to the metallic strip 52 for heating the wafer. The power supply is adjusted until the temperature monitor 42 indicates on scale 56 the correct reference temperature for which the resistivity of the semiconductor wafer is known, for example, room temperature. When this is established, the A-C bridge is balanced by appropriately adjusting the impedances of the bridge circuit. The condition of balance of the A-C bridge 44 is indicated by the oscilloscope 46 in the following manner: for example, the vertical inputs of the oscilloscope are connected across the A-C bridge circuit in the usual manner to indicate any current in an unbalanced condition. The horizontal inputs of the oscilloscope are respectively connected to the two leads to the semiconductor, the semiconductor sample being the unknown resistance in the A-C bridge circuit. The oscilloscope therefore displays the current passing through the bridge circuit in an unbalanced condition against a voltage either in phase or 180° out of phase with said current, the phase depending upon the unbalanced condition of the bridge. As a result, a line 57 is displayed on the oscilloscope having a slope depending upon the degree of unbalance of the bridge circuit.

As the temperature of the semiconductor wafer is adjusted to the appropriate reference temperature, the bridge is balanced by adjusting the impedances therein until the line 57 on the oscilloscope is exacly horizontal. The wafer is then heated until its temperature has risen to the point where its resistivity has returned to the reference temperature resistivity, the resistivity of the wafer passing through a maximum and returning to this point during the heating thereof. It is apparent that the line displayed on the oscilloscope attains a maximum slope and returns to the horizontal position corresponding with the increase in resistivity and its subsequent return to the reference temperature resistivity. When the line 57 again returns to a horizontal position, the temperature indicated by the monitor 42 is recorded.

Several individual semiconductor wafers of different impurity concentrations are carried through this process with the apparatus shown in FIGURE 5 so that a curve of the reference temperature resistivity versus the elevated temperature at which the resistivity returns to the reference temperature resistivity may be plotted, as shown in FIGURE 6. The ordinate of the curve of FIGURE 6 represents the reference temperature resistivities of the individual wafers used to calibrate the apparatus, and the abscissa represents the elevated temperatures at which the resistivity of the individual wafers return to their reference temperature resistivity. Each point on the curve represents information regarding a semiconductor sample of different impurity concentration. As will be shown hereinafter, this curve is employed in determining the resistivity of the unknown thin semiconductor film to be measured.

It is important to note that once the rebalance of the bridge is indicated on the oscilloscope, the resistivity of the sample undergoing measurement is determined. For the known samples, this is an indication that the resistivity is once again equal to the reference temperature resistivity. Thus, knowledge of the geometry of the sample undergoing measurement is not necessary. Moreover, whether the sample has a high or low bulk resistance is of no consequence, and hence need not be known, since the resistivity of the sample is a unique function of an elevated temperature if the sample possesses a resistivity equal to the elevated temperature resistivity at one, and only one, other reference temperature. Because of these facts, the only measurement, or reading from the apparatus, necessary is the rebalance temperature.

Once the apparatus shown in FIGURE 5 has been calibrated with semiconductor wafers of known reference temperature resistivities, the resistivity of an unknown wafer of like semiconductor material may be determined. Exactly the same process is followed with the unknown sample as was used with the known samples, and when rebalance is indicated, the temperature at rebalance is noted. This temperature is found on the abscissa of the curve of FIGURE 6, and the corresponding reference temperature resistivity is read from the ordinate of the curve.

The same procedure used for resistivity measurements on semiconductor wafers is used for measuring the resistivity of a thin film of semiconductor epitaxially deposited (grown) on a low resistivity metal or semiconductor substrate.

It is important to note the following precautions with regard to the application of electrical leads to thin films of semiconductors and the geometry associated therewith for greatest precision when operating the apparatus of FIGURE 5. The inherent function of the apparatus shown in FIGURE 5 is to measure the actual resistance, instead of resistivity, by a balanced bridge technique, and although the apparatus responds to actual resistance, the only information necessary for determining the resistivity of the film is a rebalance temperature, as hereinbefore explained. The success of the apparatus, however, depends on the resistivity of only the sample to be measured varying as a function of temperature. Film 2 of FIGURE 1 is illustrative of a sample to be measured, and it is important that the resistivity of the body 4 remain substantially constant with varying temperature. This is assured in most instances since its resistivity in very low (corresponding to a high impurity concentration) in comparison to that of the film. Thus an insignificant resistivity change in the body 4 results from temperature changes, as is evidenced from the curves of high impurity concentrations as shown in FIGURE 4. If this were not the case, the apparatus would yield composite information of both the body 4 and the film 2, and it would be more difficult to separate the resistance values of each. Of great significance is the fact that the total bulk resistances of the body 4 and the film 2 may be comparable, and yet, the accuracy of measurement of the resistivity of the film is not affected. This is true if the resistivity of the body 4 does not vary significantly with temperature, since only the resistivity of the film causes the bridge to unbalance and rebalance during the measurement thereof, the resistivity of the film being a unique function of the rebalance temperature.

To connect the film in one arm of the impedance bridge circuit, appropriate electrical contacts to the film 2 and body 4 are required. Referring to FIGURE 7, wherein the numerals with primes designate the equivalent electrical resistances, in schematic form, of the parts of FIGURE 1, there is shown a simplified bridge circuit (for illustrative purposes) having four impedance arms, one of which is the unknown sample. This arm of the bridge comprises the serial combination of the resistance 2' of semiconductor film 2, the resistance 4' of semiconductor body 4, the resistance 6' of an electrical lead 6 to film 2, the resistance 8' of an electrical lead 8 and any other resistance 10' intermediate to the electrical leads 6 and 8. The vertical plates 12 and 12' of the oscilloscope are connected to measure the current in an unbalanced condition, as shown, and the horizontal plates 14 and 14' of the oscilloscope are connected across the unknown impedance to measure the voltage drop thereacross, as shown. An A-C source 16 is provided and connected, as shown.

In providing the electrical lead 6 to film 2 as shown in FIGURE 1, caution should be exercised to assure an ohmic connection therebetween. The same precaution should be observed in providing an electrical lead to the body 4. These contacts, moreover, must be capable of withstanding the highest temperature to which the structure of FIGURE 1 is subjected during the measurement process. For convenience, the body 4 may be mounted on a conventional transistor header 10 with an electrical lead 8 provided to the header.

Care should also be exercised with regard to the geometry of the lead 6, the film 2 and the body 4 of FIGURE 1. In most instances, the areas of the film 2 and semiconductor body 4 will equal. And, assuming that lead 6 has a circular cross section, the diameter of the lead at the contact area with the film 2 should be small as compared to the thickness of the body so that the apparatus will yield results of greatest accuracy. In addition, although it is sometimes not possible because of the thinness of film 2, it is desirable that the diameter of the lead 6 be small in comparison to the thickness of the film. If at least the first of these conditions is met, the current, in passing through the body 4, will have a spreading effect. Thus less total resistance to current flow in attributed by the body 4 and, as a result, the bulk resistance of body 4 is negligible as compared to that of the film. Although, as hereinbefore stated, it makes no difference if the bulk resistance of the body 4 is large if the resistivity thereof does not vary as a function of temperature, accuracy during measurements is assured when the resistivity of the body 4 does vary to some degree if the bulk resistance contributed thereby is small as compared with that of the film 2.

Again referring to FIGURE 7, the structure of FIGURE 1 is electrically connected in one arm of the bridge circuit via leads 6 and 8. The transistor header 10 is used as a convenient means of transferring heat to the film from the heater strip as described with reference to FIGURE 5. The heater 52 is adjusted to establish the temperature of film 2, body 4 and header 10 at the reference temperature, the bridge at that time being adjusted to a balanced condition. The structure is then heated to the elevated temperature at which the bridge again balances. This is accomplished by appropriately adjusting the heater current. If the temperature is in excess of the rebalance temperature, the straight line displayed on the oscilloscope will have a negative slope. If the temperature is below the rebalance temperature, the line will have a positive slope. It is therefore apparent that the oscilloscope not only indicates the condition of balance when the line is exactly horizontal but, moreover, acts as a phase meter to indicate whether the temperature of the sample is higher or lower than the rebalance temperature.

The rebalance temperature is recorded from the monitor 42, and this rebalance temperature is found on the abscissa of the curve shown in FIGURE 6, the corresponding reference temperature resistivity being read directly from the curve on the ordinate. Thus the reference temperature resistivity of the semiconductor film 2 is determined. Since the known samples used to establish the curve of FIGURE 6 have known impurity concentrations, the impurity concentration of the unknown sample may also be determined.

It is important, when determining the resistivity of an unknown sample at a reference temperature, that the known samples used to calibrate the apparatus be of the same semiconductor material as the sample. Moreover, the same reference temperature must be used throughout the calibration and measurement of the unknown sample. For expediency, the scale 56 of the temperature monitor 42 may be calibrated in either units of resistivity or in units of resistivity and temperature for any given semiconductor material and reference temperature, so that the unknown resistivity may be directly read therefrom without the use of the curve of FIGURE 6.

FIGURE 8 is a sectional view of another arrangement that may be used with the apparatus and method of this invention. Instead of providing a lead to the header 10, a pair of spaced-apart leads 6 and 11 are provided to the surface of the film 2, observing the aforementioned precautions for lead connections to the film. Current from one lead passes directly through the film to the body 4, and returns directly through the film to the other lead. The low resistivity body 4 provides a shunting path for any lateral resistance of the film between the contacts 6 and 11. Therefore, this arrangement gives equivalent results to that of the arrangement of FIGURE 1.

Although the apparatus and method of the present invention find great utility in the determination of the resistivity of a thin semiconductor film epitaxially deposited, or grown, on a substrate of metal or of low resistivity semiconductor material of the same conductivity type, it is equally effective for the same determinations of thin or thick wafers of semiconductor materials that are not deposited on, or electrically shunted by, a low resistivity substrate, as is evidenced by the measurements made on the known samples in the foregoing description for calibration. For best results, only resistivity of the unknown sample should vary with temperature. In addition, the maximum accuracy in resistivity and impurity concentration determinations results by using only samples of uniform impurity concentration throughout and whose impurities are not partially or completely compensated by opposite conductivity type determining impurities.

The method and apparatus, as described, finds additional utility for profiling samples whose resistivity is nonuniform along any one axis through the sample. For example, if a semiconductor wafer having a uniform resistivity along the axis of thickness has a nonuniform resistivity characteristic in a plane perpendicular to its thickness, the profile of the resistivity over its entire area may be obtained by employing the same method and apparatus aforedescribed wherein readings are taken in as many distinct locations on the surface of the wafer as desired. On the other hand, if the unknown sample exhibits a nonuniform resistivity characteristic along its axis of thickness but a uniform resistivity characteristic along any plane perpendicular to the axis of thickness, the profile of the resistivity along the axis may be obtained by bevel lapping completely through the sample at a very small angle with the plane of the surface thereof. It may be that the unknown sample is a thin layer of semiconductor deposited on a low resistivity body, as shown in FIGURE 9, in which case an excellent support is provided for the layer during lapping.

As shown in FIGURE 9, a thin layer 106 of semiconductor is deposited on a low resistivity body 104. A portion 102 of the layer 106 is bevel-lapped at a very slight angle with the plane of the surface of the layer. The method and apparatus, as hereinbefore described, are used to make successive measurements at several distinct locations on the surface of the beveled portion 102. For illustrative purposes, there are shown only three connections 108, 108' and 108" respectively to three distinct locations 109, 109' and 109" on the surface of the beveled portion 102, although many more locations would normally be used to determine accurately the resistivity profile through the layer 106 along an axis designated by Y. The profile is determined as follows: A resistivity measurement is made at a location 109 very near the thinnest portion of the beveled portion 102, the assumption being that this thin portion of the layer exhibits a uniform resistivity along the axis Y. Next, another measurement is made on a slightly thicker portion at location 109'. This latter measurement yields composite results of two adjacent layers of material, each having its own distinct uniform resistivity. Since the resistivity of the first layer has been determined by the first measurement, the resistivity of the second layer can be determined by referring to a resistivity versus temperature curve characteristic of the semiconductor for various impurity concentrations, for example, FIGURE 4. By observing the temperature at which the resistivity of the first layer again equals its reference temperature resistivity, and also observing the temperature at which the composite resistivity of the two layers equals its reference temperature resistivity, the resistivity of the second layer alone can be determined as that value just sufficient to offset the resistivity of the first layer in order to yield the composite resistivity. This procedure can be used successively by making measurements at successively thicker portions up the incline of the beveled portion 102 of the layer. Thus the profile of the resistivity along the Y axis of the layer can be determined accordingly.

What is claimed is:

1. A method for determining the resistivity of a semiconductor comprising the steps of electrically connecting said semiconductor in an impedance bridge, balancing said bridge when said semiconductor is at a reference temperature, then rebalancing said bridge by heating the semiconductor to raise its temperature above said reference temperature, said rebalancing occurring after the increase in temperature has initially caused an increase in resistivity of said semiconductor, followed by a decrease in resistivity, the resistivity of said semiconductor at said rebalancing temperature being substantially equal to the resistivity at said reference temperature, and converting the value of said rebalancing temperature to a corresponding resistivity.

2. A method for determining the concentration of impurity atoms in a semiconductor comprising the steps of electrically connecting said semiconductor in an impedance bridge, balancing said bridge when said semiconductor is at a reference temperature, then rebalancing said bridge by heating said semiconductor to raise its temperature above said reference temperature, said rebalancing occurring after an increase in temperature has initially caused an increase in resistivity of said semiconductor, followed by a decrease in resistivity, the resistivity of said semiconductor at said rebalancing temperature being substantially equal to the resistivity at said reference temperature and converting the rebalancing temperature value to a corresponding impurity concentration.

3. A method of determining the resistivity of a thin layer of semiconductor deposited on a surface of a low resistivity semiconductor body of the same conductivity type comprising the steps of providing electrical leads to a surface of said layer and to said low resistivity semiconductor body, connecting said layer and said body in an impedance bridge via said leads, balancing said bridge when said semiconductor is at a reference temperature, then rebalancing said bridge by heating said semiconductor layer to increase its temperature above said reference temperature, said rebalancing occurring after said increase in temperature has initially caused an increase in resistivity of said layer followed by a decrease in resistivity, the resistivity of said layer at said rebalancing temperature being substantially equal to the resistivity at said reference temperature, and converting the rebalancing temperature value to a corresponding resistivity value.

4. A method of determining the concentration of impurity atoms in a thin layer of semiconductor deposited on a surface of a low resistivity semiconductor body of the same conductivity type comprising the steps of providing electrical leads to a surface of said layer and to said low resistivity semiconductor body, connecting said layer and said body in an impedance bridge via said leads, balancing said bridge when said semiconductor is at a reference temperature, then rebalancing said bridge by heating said semiconductor layer to increase its temperature above said reference temperature, said rebalancing occurring after said increase in temperature has initially caused an increase in resistivity of said layer, followed by a decrease in resistivity, the resistivity of said layer at said rebalancing temperature being substantially equal to the resistivity at said reference temperature, and converting the rebalancing temperature value to a corresponding impurity concentration.

References Cited

UNITED STATES PATENTS 2,743,420    4/1956    Haldeman     324—158

EDWARD E. KUBASIEWICZ, Primary Examiner

U.S. Cl. X.R.

324—158